(12) United States Patent
Hansbrough et al.

(10) Patent No.: US 10,956,237 B2
(45) Date of Patent: Mar. 23, 2021

(54) INTER-APPLICATION SHARING OF BUSINESS INTELLIGENCE DATA

(71) Applicant: Oracle International Corporation, Redwood Shores, CA (US)

(72) Inventors: Reginald Hansbrough, Celina, TX (US); Sergio Acosta, Zapopan (MX); Victor Medina, Tlaquepaque (MX); Lakshmi Dontamsetti, Fremont, CA (US); Abraham Vargas, Zapopan (MX); Victor Cervantes, Zapopan (MX); Eduardo Martinez, Mexicali (MX)

(73) Assignee: Oracle International Corporation, Redwood Shores, CA (US)

( * ) Notice: Subject to any disclaimer, the term of this patent is extended or adjusted under 35 U.S.C. 154(b) by 44 days.

(21) Appl. No.: 15/691,550

(22) Filed: Aug. 30, 2017

(65) Prior Publication Data
US 2018/0348979 A1    Dec. 6, 2018

Related U.S. Application Data

(60) Provisional application No. 62/514,682, filed on Jun. 2, 2017.

(51) Int. Cl.
*G06F 9/54* (2006.01)
*G06F 3/0486* (2013.01)
(Continued)

(52) U.S. Cl.
CPC ............ *G06F 9/543* (2013.01); *G06F 3/0486* (2013.01); *H04L 67/10* (2013.01); *H04L 67/36* (2013.01);
(Continued)

(58) Field of Classification Search
CPC .......... H04W 4/60; H04L 67/42; H04L 67/36; H04L 67/10; G06F 3/0486;
(Continued)

(56) References Cited

U.S. PATENT DOCUMENTS 5,418,948 A    5/1995  Turtle
7,047,242 B1   5/2006  Ponte
(Continued)

OTHER PUBLICATIONS

Data sources for Power BI service, Microsoft Power BI, https://powerbi.microsoft.com/en-us/documentation/powerbi-service-get-data/,2015, 7 pages, retrieved on Mar. 10, 2016.
(Continued)

*Primary Examiner* — Kieu D Vu
*Assistant Examiner* — Rami R Okasha
(74) *Attorney, Agent, or Firm* — Trellis IP Law Group, PC

(57) ABSTRACT

Implementations generally relate to inter-application sharing. In some implementations, a method includes displaying a first user interface (UI) of a first application in a display screen of a client device, wherein the first UI presents information associated with a target project. The method further includes displaying a second UI of a second application in the display screen of the client device. The method further includes receiving a user indication to transfer the information associated with the target project from the first UI to the second UI. The method further includes accessing underlying data associated with the target project. The method further includes transferring the underlying data from the first application to the second application. The method further includes displaying the information associated with the target project in the second UI after the transferring.

20 Claims, 17 Drawing Sheets

(51) Int. Cl.
  *H04L 29/06* (2006.01)
  *G06F 3/0484* (2013.01)
  *H04W 4/60* (2018.01)
  *H04L 29/08* (2006.01)

(52) U.S. Cl.
  CPC .......... *H04W 4/60* (2018.02); *G06F 3/04842* (2013.01); *G06F 2203/04803* (2013.01); *H04L 67/42* (2013.01)

(58) Field of Classification Search
  CPC ............... G06F 3/04842; G06F 3/0482; G06F 3/04883; G06F 3/0484; G06F 2203/04803; G06F 9/543; G06F 2209/545; G06F 9/451
  See application file for complete search history.

(56) References Cited

U.S. PATENT DOCUMENTS

| | | | | |
|---|---|---|---|---|
| 7,802,195 | B2* | 9/2010 | Saul | G06F 3/0486 709/202 |
| 8,533,619 | B2 | 9/2013 | Baier | |
| 8,745,390 | B1* | 6/2014 | Atwood | H04L 63/061 713/169 |
| 8,788,514 | B1 | 7/2014 | Ramanarayanan | |
| 8,839,266 | B1* | 9/2014 | Partridge | G06F 13/00 719/310 |
| 8,954,446 | B2 | 2/2015 | Igeta | |
| 8,959,446 | B2* | 2/2015 | Igeta | G06F 3/0486 715/769 |
| 8,966,386 | B2* | 2/2015 | Fok | G06F 3/0486 715/769 |
| 9,092,802 | B1 | 7/2015 | Akella | |
| 9,098,183 | B2* | 8/2015 | Vonshak | G06F 3/048 |
| 9,164,673 | B2* | 10/2015 | Cheng | G06F 3/048 |
| 9,179,061 | B1 | 11/2015 | Kraft | |
| 9,338,652 | B1* | 5/2016 | Allen | H04W 12/06 |
| 9,424,367 | B2* | 8/2016 | Baarz | G06F 16/904 |
| 9,501,585 | B1 | 11/2016 | Gautnam | |
| 9,582,913 | B1 | 2/2017 | Kraft | |
| 9,870,629 | B2 | 1/2018 | Cardno | |
| 10,048,854 | B2* | 8/2018 | Zhang | G06F 3/0486 |
| 10,192,330 | B2* | 1/2019 | Shetty | G06T 11/206 |
| 2005/0060286 | A1 | 3/2005 | Hansen | |
| 2005/0076085 | A1* | 4/2005 | Budd | G06Q 10/107 709/206 |
| 2007/0061751 | A1* | 3/2007 | Cory | G06Q 10/10 715/804 |
| 2007/0061752 | A1* | 3/2007 | Cory | G06F 9/543 715/804 |
| 2007/0279484 | A1 | 12/2007 | Derocher | |
| 2008/0118916 | A1 | 5/2008 | Siegemund | |
| 2008/0233980 | A1 | 9/2008 | Englund | |
| 2009/0234882 | A1* | 9/2009 | Ota | G06F 16/58 |
| 2009/0327263 | A1 | 12/2009 | Maghoul | |
| 2010/0070448 | A1 | 3/2010 | Omoigui | |
| 2011/0055241 | A1 | 3/2011 | Lewis | |
| 2011/0081948 | A1 | 4/2011 | Shirai | |
| 2011/0123115 | A1 | 5/2011 | Lee | |
| 2011/0249900 | A1 | 10/2011 | Thorn | |
| 2011/0271218 | A1* | 11/2011 | Berger | G06F 3/0486 715/770 |
| 2012/0005045 | A1* | 1/2012 | Baker | G06Q 30/0643 705/27.2 |
| 2012/0066602 | A1* | 3/2012 | Chai | G06F 3/04817 715/733 |
| 2012/0084689 | A1* | 4/2012 | Ledet | G06F 3/0486 715/769 |
| 2012/0088543 | A1 | 4/2012 | Lindner | |
| 2012/0110565 | A1 | 5/2012 | O'Sullivan | |
| 2012/0134590 | A1 | 5/2012 | Pelrou | |
| 2012/0259833 | A1 | 10/2012 | Paduroiu | |
| 2012/0289290 | A1* | 11/2012 | Chae | G06F 3/0488 455/566 |
| 2012/0311074 | A1* | 12/2012 | Arini | H04N 21/23109 709/217 |
| 2012/0323910 | A1 | 12/2012 | Llyas et al. | |
| 2013/0006904 | A1 | 1/2013 | Horvitz | |
| 2013/0042259 | A1* | 2/2013 | Urbach | G06F 3/0486 719/329 |
| 2013/0097177 | A1* | 4/2013 | Fan | G06F 17/246 707/748 |
| 2013/0113943 | A1 | 5/2013 | Wormald | |
| 2013/0117319 | A1* | 5/2013 | Soltani | G06F 9/541 707/792 |
| 2013/0145244 | A1* | 6/2013 | Rothschiller | G06F 17/246 715/212 |
| 2014/0040977 | A1* | 2/2014 | Barton | H04L 63/20 726/1 |
| 2014/0068273 | A1* | 3/2014 | Sobel | G06F 21/604 713/189 |
| 2014/0108793 | A1* | 4/2014 | Barton | G06F 21/6218 713/165 |
| 2014/0172408 | A1 | 6/2014 | Vukosavljevic | |
| 2014/0177839 | A1* | 6/2014 | Wagner | G06F 21/60 380/259 |
| 2014/0281548 | A1* | 9/2014 | Boyer | H04L 63/061 713/171 |
| 2014/0337628 | A1* | 11/2014 | Amato | H04L 9/0825 713/171 |
| 2015/0012830 | A1* | 1/2015 | Choi | G06F 3/0481 715/733 |
| 2015/0012854 | A1 | 1/2015 | Choi | |
| 2015/0026145 | A1 | 1/2015 | Prakash | |
| 2015/0026153 | A1 | 1/2015 | Gupta | |
| 2015/0033131 | A1* | 1/2015 | Peev | G06F 3/04815 715/731 |
| 2015/0138228 | A1 | 5/2015 | Chapman | |
| 2015/0195345 | A1* | 7/2015 | Burrows | G06Q 10/06393 715/739 |
| 2015/0227632 | A1 | 8/2015 | Lunardi | |
| 2015/0242086 | A1* | 8/2015 | Mindlin | G06F 3/0481 715/769 |
| 2015/0347920 | A1 | 12/2015 | Medlock | |
| 2015/0356068 | A1* | 12/2015 | Hill | G06F 17/245 715/227 |
| 2015/0365426 | A1* | 12/2015 | Henocque | H04L 9/00 713/176 |
| 2016/0055374 | A1 | 2/2016 | Zhang | |
| 2016/0085602 | A1* | 3/2016 | Jacobson | G06F 9/546 726/30 |
| 2016/0092572 | A1* | 3/2016 | Venkata | G06F 16/24534 707/709 |
| 2016/0103801 | A1* | 4/2016 | Bortz | G06F 16/9558 715/205 |
| 2016/0117072 | A1* | 4/2016 | Sharifi | G06F 3/04842 715/769 |
| 2016/0306777 | A1* | 10/2016 | George | G06Q 30/02 |
| 2016/0371495 | A1* | 12/2016 | Bhat | G06F 21/53 |
| 2017/0031825 | A1* | 2/2017 | Chen | G06F 12/0862 |
| 2017/0031831 | A1* | 2/2017 | Bohra | G06F 12/0871 |
| 2017/0039281 | A1 | 2/2017 | Venkata | |
| 2017/0041296 | A1* | 2/2017 | Ford | G06F 16/951 |
| 2017/0118308 | A1 | 4/2017 | Vigeant et al. | |
| 2017/0160895 | A1* | 6/2017 | Hu | G06F 3/04817 |
| 2017/0237868 | A1 | 8/2017 | Sato | |
| 2017/0302449 | A1* | 10/2017 | Wagner | H04L 9/0822 |
| 2017/0308271 | A1* | 10/2017 | Li | G06F 3/0488 |
| 2017/0351708 | A1 | 12/2017 | Lahmann | |
| 2017/0357437 | A1* | 12/2017 | Peterson | G06F 3/0486 |
| 2018/0069947 | A1* | 3/2018 | Antipa | H04L 67/327 |
| 2018/0150899 | A1 | 5/2018 | Waldron | |
| 2018/0335911 | A1* | 11/2018 | Nilo | G06F 3/0482 |
| 2018/0335912 | A1* | 11/2018 | Nilo | G06F 3/0482 |
| 2018/0352172 | A1 | 12/2018 | Hansbrough | |

OTHER PUBLICATIONS

Google Now, available online at https://en.wikipedia.org/wiki/Google_Now, Oct. 29, 2015, 6 pages, retrieved on Jan. 10, 2017.

(56) References Cited

OTHER PUBLICATIONS

Microsoft Power BI (Business intelligence), available online at https://en.wikipedia.org/wiki/Power_BI, 2 pages, updated on Aug. 29, 2016; retrieved on Sep. 22, 2016.

Power BI—basic concepts, Microsoft Power BI, available online at https://powerbi.microsoft.com/enus/documentation/powerbi-service-basic-concepts/, 2015, 11 pages, retrieved on Mar. 10, 2016.

NOVET, Birst lets you search enterprise data like you search Google, VentureBeat, available online at http://venturebeat.com/20I3/12/1 0/birst-boosts-business-intelligence-with-google-like-search-to-visualize-data/, Dec. 10, 2013, 3 pages, retrieved on Mar. 10, 2016.

Power BI Support, Q&A in Power BI, available online at https://powerbi.microsoft.com/en-us/documentation/powerbiservice-q-and-a/, 2015, 4 pages, retrieved on Mar. 10, 2016.

Search-Driven Analytics for Humans—Now anyone can be their own data analyst, Thought Spot, available online at www.thoughtspot.com, 4 pages, retrieved on Mar. 10, 2016.

\* cited by examiner

1700

INTER-APPLICATION SHARING OF BUSINESS INTELLIGENCE DATA

CROSS REFERENCES TO RELATED APPLICATIONS

This application claims priority from, and the benefits of U.S. Provisional Patent Application Ser. No. 62/514,682, entitled INTER-APPLICATION SHARING, filed on Jun. 2, 2017, which is hereby incorporated by reference as if set forth in full in this application for all purposes.

This application is related to the following applications, U.S. patent application Ser. No. 15/273,567, entitled DAY-BY-DAY, filed on Sep. 22, 2016, which claims priority to U.S. Provisional Patent Application Ser. No. 62/246,031, entitled DAY-BY-DAY, filed on Oct. 24, 2015, which are hereby incorporated by reference as if set forth in full in this application for all purposes.

SUMMARY

Implementations generally relate to inter-application sharing. Implementations enable a user to share information between applications on a client device by dragging and dropping target information from a first application to a second application in a split screen mode. Implementations transfer not only the target information but also underlying data associated with the target information, which enables the user to manipulate the underlying data in the second application.

In some implementations, an apparatus includes one or more processors, and includes logic encoded in one or more non-transitory computer-readable storage media for execution by the one or more processors. When executed, the logic is operable to perform operations including displaying a first user interface (UI) of a first application in a display screen of a client device, where the first UI presents information associated with a target project. The logic when executed is further operable to perform operations including displaying a second UI of a second application in the display screen of the client device. The logic when executed is further operable to perform operations including receiving a user indication to transfer the information associated with the target project from the first UI to the second UI. The logic when executed is further operable to perform operations including accessing underlying data associated with the target project. The logic when executed is further operable to perform operations including transferring the underlying data from the first application to the second application. The logic when executed is further operable to perform operations including displaying the information associated with the target project in the second UI after the transferring.

A further understanding of the nature and the advantages of particular embodiments disclosed herein may be realized by reference of the remaining portions of the specification and the attached drawings.

DETAILED DESCRIPTION OF EMBODIMENTS

Figure 1:
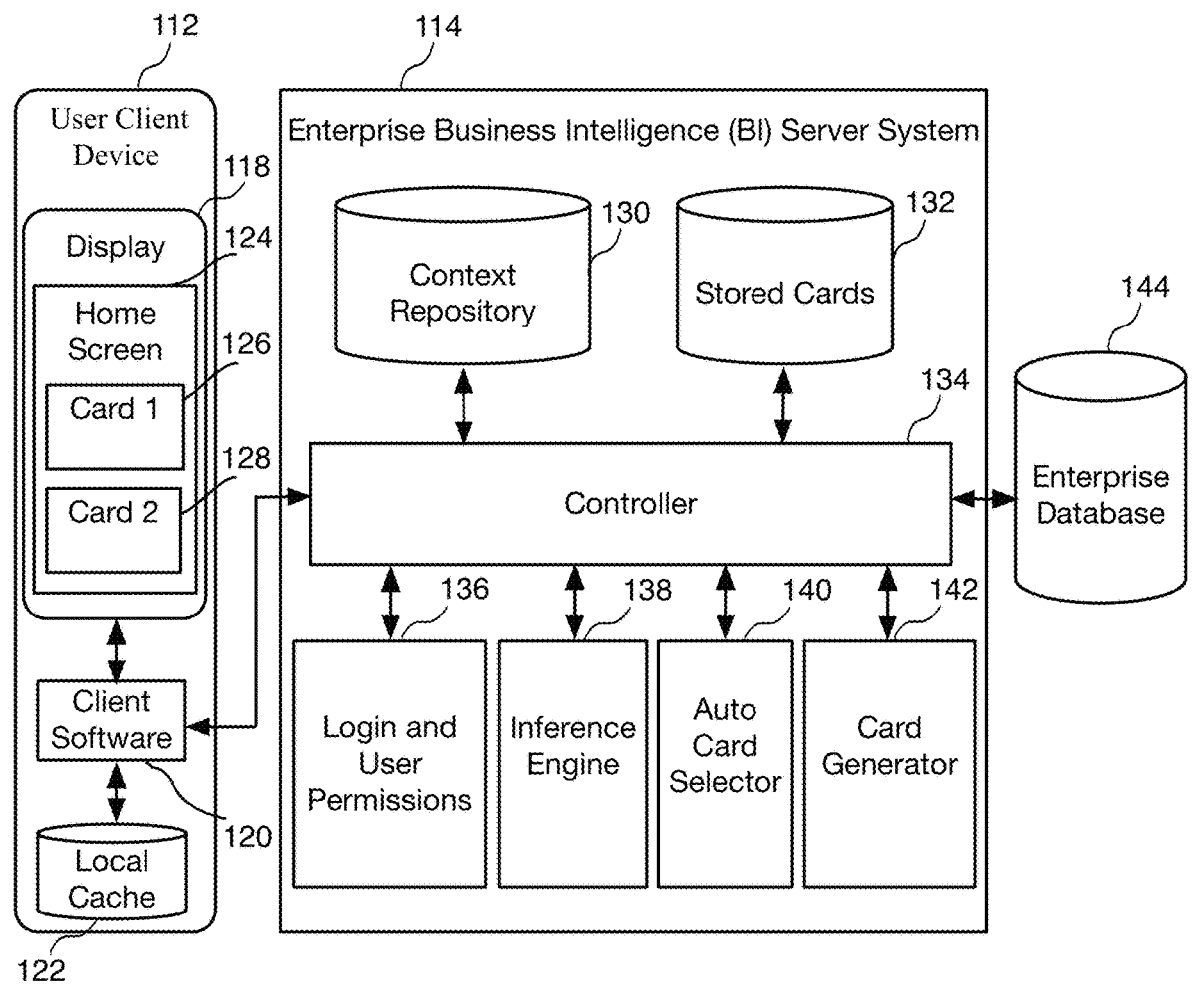
FIG. 1 illustrates a block diagram of an example computing environment, which may be used for implementations described herein.

Implementations described herein facilitate inter-application sharing of information. As described in more detail herein, implementations enable a user to share information such as chart data between applications (e.g., mobile applications, etc.) on a client device by dragging and dropping the information from a source application to a recipient application in a split screen (multi-window) mode. Implementations transfer not only the target information but also underlying data associated with the target information, which enables the user to manipulate the underlying data in the second application.

In some implementations, a system displays a user interface (UI) of a source application in a display screen of a client device, where the first UI presents information associated with a target project. The system also displays a UI of a recipient application in the display screen of the client device. The system also receives a user indication to transfer the information associated with the target project from the UI of the source application to the UI of the second application. The system accesses underlying data associated with the target project. The system transfers the underlying data from the source application to the second application. The system displays the information associated with the target project in the second UI after the transferring.

The following are definitions to provide further context and applications of implementations described herein. In various implementations, an enterprise may be any organization of persons, such as a business, university, government, military, and so on. The terms "organization" and "enterprise" are employed interchangeably herein. Personnel of an organization, e.g., enterprise personnel, may include any persons associated with the organization, such as employees, contractors, board members, customer contacts, and so on.

An enterprise computing environment may be any computing environment used for a business or organization. A computing environment may be any collection of computing resources used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include human resources (HR) (e.g., enterprise personnel), financial resources, assets, employees, business contacts, and so on, of an enterprise. The terms "ERP software," "ERP application," and "enterprise software" may be employed interchangeably herein. However, an ERP application may include one or more ERP software modules or components, such as user interface (UI) software modules or components.

Enterprise software applications, such as customer relationship management (CRM), business intelligence (BI), and project management software, often include databases with various database objects, also called data objects or entities. For the purposes of the present discussion, a database object may be any computing object maintained by a database. A computing object may be any collection of data and/or functionality. Examples of computing objects include a note, appointment, a particular interaction, a task, and so on. Examples of data that may be included in an object include text of a note (e.g., a description); subject, participants, time, and date, and so on, of an appointment; type, description, customer name, and so on, of an interaction; subject, due date, opportunity name associated with a task, and so on. An example of functionality that may be associated with or included in an object includes software functions or processes for issuing a reminder for an appointment.

For the purposes of the present discussion, software functionality may be any function, capability, or feature, e.g., stored or arranged data, that is provided via computer code, e.g., software. Generally, software functionality may be accessible via use of a UI and accompanying UI controls and features. Software functionality may include actions, such as retrieving data pertaining to a computing object (e.g., business object); performing an enterprise-related task, such as scheduling a meeting, promoting, hiring, and firing enterprise personnel, placing orders, calculating analytics, launching certain dialog boxes, performing searches, and so on.

Such tasks may represent or be implemented via one or more software actions. A software action may be any process or collection of processes or operations implemented via software. Additional examples of processes include updating or editing data in a database, placing a product order, creating an opportunity business object, creating a business contact object, adding a revenue line to a business object, displaying data visualizations or analytics, triggering a sequence of processes, launching an enterprise software application, displaying a dialog box, and so on. The terms "software action" and "action" are employed interchangeably herein.

Enterprise data may be any information pertaining to an organization or business, including information about customers, appointments, meetings, opportunities, customer interactions, projects, tasks, resources, orders, enterprise personnel, and so on. Examples of enterprise data include work-related notes, appointment data, customer contact information, descriptions of work orders, asset descriptions, photographs, contact information, calendar information, enterprise hierarchy information (e.g., corporate organizational chart information), and so on.

For the purposes of the present discussion, a server may be any computing resource, such as a computer and/or software that is adapted to provide content, e.g., data and/or functionality, to another computing resource or entity that requests it, e.g., the client. A client may be any computer or system that is adapted to receive content from another computer or system, called a server. A service oriented architecture (SOA) server may be any server that is adapted to facilitate providing services accessible to one or more client computers coupled to a network.

A networked computing environment may be any computing environment that includes intercommunicating computers, e.g., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

Enterprise software applications, including applications for implementing cloud services, are often distributed among one or more servers as part of a computing domain, also called a server domain or server system herein. For the purposes of the present discussion, a computing domain may be any collection of one or more servers running software that is managed by a single administrative server or associated application. An example of a computing domain is a web logic server (WLS) domain.

When the term "domain" is used herein with reference to a database, e.g., an enterprise database, the database describes the domain. For example, a CRM database is said to characterize a CRM domain, which may include a set of related computing objects characterizing customer relationship management data and functionality.

A cloud service may be any mechanism (e.g., one or more web services, application programming interfaces (APIs), etc.) for enabling a user to employ data and/or functionality provided via a cloud. A cloud may be any collection of one or more servers. For example, certain clouds are implemented via one or more data centers with servers that may provide data, data storage, and other functionality accessible to client devices.

Note that conventionally, certain enterprise software customers (e.g., enterprises using the enterprise software) may subscribe to and access enterprise software by subscribing to a particular suite of cloud services offered via the enterprise software. Various components of the enterprise software may be distributed across resources (e.g., servers) of a network.

For clarity, certain well-known components, such as hard drives, processors, operating systems, power supplies, routers, the Internet, administration servers, server cluster controllers, process schedulers, virtual machines, database management systems, mobile device managers, synchronization engines, Application Programming Interfaces (APIs), web services, and so on, are not necessarily explicitly called out in the figures. However, those skilled in the art with access to the present teachings will know which components to implement and how to implement them to meet the needs of a given implementation.

FIG. 1 illustrates a block diagram of an example computing environment 100, which may be used for implementations described herein. In various implementations, computing environment 100 is configured to enable selective context-based enterprise business intelligence (BI) content delivery to one or more mobile computing devices such as user client device 112, or client device 112, leveraging both intrinsic context (e.g., representing user-specified selections, conditions, etc.) and extrinsic context (e.g., overall system usage history, physical device location, user team membership, user data access permissions, etc.).

For the purposes of the present discussion, context information may be any metadata (e.g., data about or otherwise associated with other data or computing objects or entities) that may be associated with a user, user interaction with a computing device, a computing device (including software used by the computing device), and so on. The terms "context information" and "context" may be employed interchangeably herein.

A mobile device, also called a mobile computing device, may be any computer that is adapted for portable use. A computer may be any processor coupled to memory. Examples of mobile computing devices include laptops, notebook computers, smartphones and tablets (e.g., iPhone, iPad, Galaxy Tab, Windows Mobile smartphones, Windows 7 smartphones and tablets, Android smartphones tablets, Blackberry smartphones, and so on), etc.

Intrinsic context information may be any context information that is specifically chosen or specified by the user, e.g., via user input. Examples of intrinsic context information characterizing information sought by a user include natural language query statements and expressions, user-specified bring back conditions, and so on. A bring back condition may be any user-specified data that when true, may be used to redisplay or retrieve content associated with the condition when the condition is met, as determined by the system with reference to extrinsic context information. Examples of bring back conditions are discussed more fully below.

Extrinsic context information may be any context information that is not explicitly chosen or specified by a user so as to affect software operation. Examples of extrinsic context information include user data access permissions (e.g., associated with user login credentials), user computing device location devices such as a global positioning system (GPS) receivers, user teams or collaboration groups, business tasks assigned to a user, projects that a user is working on, data characterizing a history of user interaction with computing environment 100, time of day, day of week, date, contact lists, information about who has recently contacted a user and where and how they were contacted, and so on. Extrinsic context information may also include aggregated metrics calculated from analysis of activities of plural users of computing environment 100 (e.g., all authorized users interacting with computing environment 100), and so on.

Computing environment 100 may leverage both intrinsic and extrinsic context to facilitate efficient timely delivery of relevant business intelligence (BI) content (e.g., analytics) to users, as discussed more fully below.

Business context information may include any context information that is related to a business entity, e.g., a resource, software application, employee, enterprise task, opportunity, contact, and so on. The terms "business context information" and "business context" are employed interchangeably herein.

As it pertains to natural language processing (NLP), e.g., mechanisms for generating machine interpretations of natural language expressions, context information may include any information that may be employed to inform natural language processing to estimate user intent or meaning of natural language or portions thereof. User intent of a portion of natural language is said to be estimated if a meaning is associated with or attributed to the portion of natural language. Accordingly, context information may include any information pertaining to natural language input, including, but not limited to user data, such as user location information, calendar entries, appointments, business cycle information, contacts, employee performance metrics, user data access permissions or authentication level, and so on.

As it pertains to software visualizations (e.g., analytics and associated charts, graphs, diagrams, etc.), context information may include any information that is auxiliary to source data used to display a visualization. Source data may be any data used to build a structure of a visualization. For example, a corporate organizational chart may use employee names, employee enterprise roles, and hierarchal rules applicable to enterprise roles as source data to construct the organizational chart. In this example, context information may include, for example, information indicating that a user is seeking information as to whether a particular decision made by a particular employee was approved by the appropriate persons, or that the user is on a project pertaining to corporate compensation levels and may wish to ensure that higher level employees are not compensated less than lower level employees, and so on.

In some implementations, the computing environment 100 may collect context information via various mechanisms, such as via one or more user responses to a query; user answers to a questionnaire; monitoring of user software usage history; location information, and so on.

Context information is said to be associated with a user if the context information is associated with a device or software accessible to the user. For example, a mobile phone user may be employing a mobile device with a GPS receiver. The mobile device is said to be associated with the user, as is GPS location information provided by the GPS receiver thereof. Similarly, a user employing calendar software may enter appointments. Appoint information stored via the calendar software is associated with the user.

Accordingly, context information associated with a user (also called individual user context information) may include any context information pertaining directly to the user or pertaining to one or more tasks, opportunities, or other computing objects (e.g., business objects) that are associated with or otherwise employed by the user or used by software employed by the user).

Note that in certain embodiments discussed herein, user context information may be derived, in part, with reference to a permissions database that stores user enterprise access permissions, e.g., software and data access and user privileges. Note that user data may be any context information characterizing or otherwise associated with a user of software and/or hardware. For example, user data may include enterprise software permissions (e.g., privileges), job qualifications, such as work experience, education and related degrees, awards, and so on. User data may further include, for example, user job preferences, such as location, employer, vacation time allowed, hours worked per week, compensation (e.g., salary), and so on.

User privileges information may be any permissions or specification of permissions associated with a user, where the permissions specify whether or not and/or how a user may access or use data, software functionality, or other enterprise resources. Accordingly, user privileges information, also simply called user permissions or user privileges, may define what a user is permitted or not permitted to do in association with access to or use of enterprise resources, such as computing resources.

User job role information may include any data characterizing a position or description of a position held by the user at an enterprise. Accordingly, job role information may be a type of context information associated with the user, where the context information may also include user privileges information associated with the job role, e.g., position. For example, if a user is a system administrator employee, the user may have special permissions to change system configuration parameters and may then have access to various types of visualizations characterizing system architecture, operations, and so on.

In some implementations, the one or more mobile computing devices (e.g., client device 112) (e.g., smartphone, tablet, laptop, etc.) communicate with an enterprise business intelligence (BI) server system 114 via a network, such as the Internet. BI server system 114 communicates with backend enterprise databases 144 (which may include warehouses or collections of databases), e.g., BI, HCM, CRM databases, and so on.

Note that various modules of the computing environment 100 may be grouped, arranged, coupled, and/or distributed differently than shown, without departing from the scope of the present teachings. For example, in an alternative grouping, enterprise databases 144 may be considered as part of BI server system 114. Similarly, some software functionality provided by BI server system 114 and enterprise databases 144 may be offloaded to client device 112 (e.g., mobile device, etc.), e.g., enterprise content may be cached locally on the client device 112 and used in an offline mode, as discussed more fully below. Similarly, in certain implementations, interconnections between modules may be different than those shown.

In various implementations, client device 112 includes a display 118 for presenting UI display screens, such as a home screen 124, also called an activity screen, dashboard, smart feed of BI content, or simply feed.

For the purposes of the present discussion, a user interface display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view, window, or card (where a card may represent a sub-UI display screen within a larger UI display screen). Views or windows may include sections, such as sub-views or sub-windows, dialog boxes, graphs, tables, UI cards, and so on. In certain cases, a UI display screen may refer to all application windows presently displayed on a display.

For the purposes of the present discussion, a UI card may be a UI display screen section. In various embodiments discussed herein UI cards may contain specific categories of content and associated enterprise data and/or analytics, as discussed more fully below.

The example home screen or smart feed 124 of client device 112 includes a scrollable listing if UI cards, including a first example card 126 (e.g., content 1) and a second example card 128 (e.g., content 2). Examples of UI card types include analytic cards, detailed information cards, email cards, calendar cards, report cards, trending-data cards (also called "what's trending" cards), shared cards, activity summary cards, custom cards, and so on.

In general, content included in example analytic cards discussed herein may include analytics, e.g., interactive visualizations. For the purposes of the present discussion, an analytic may be any calculation or measurement based on a given input. Certain analytics may be displayed graphically. For example, an analytic that calculates a degree of a match between a user and a candidate position based on information about the user and various candidate positions may be displayed via a bar chart. In general, a graphically displayed analytic or other visual representation of data is called a visualization herein.

An interactive visualization may be any visualization that includes or is displayed in association with one or more UI controls enabling user interactions with the visualization and/or underlying data of the visualization. A user interaction may include any user input resulting in an adjustment to an appearance, behavior, type, or other property of a visualization.

Examples of interactions that may be supported by analytic cards discussed herein include drill-down (e.g., selection of a portion or node of a visualization to trigger display of additional details associated with data underlying the portion or node of the visualization), change chart type, pivot (e.g., changing chart axis), filter data, show/hide a group, data hierarchy, dimension, and so on. Note that user interactions and associated UI controls discussed herein with respect to analytic cards are not limited. For example, certain cards may be flipped or rotated to yield additional information; certain cards may support user edits to underlying data of a visualization, and so on.

For the purposes of the present discussion, underlying data may be any data used to generate a visualization, where nodes or components of the visualization may represent one or more objects, database dimensions, features, or other data characteristics. Hence, underlying data may include information and/or functionality represented by or corresponding to a node or visualization component, including link information. For example, a node representing a person in an enterprise organizational chart may be associated with additional underlying data that includes, for example, employee job title, phone number, address, and so on.

In various embodiments discussed herein, underlying data of a visualization may include structured data. Structured data may be any data organized or otherwise accessible in accordance with a data model, e.g., as may be provided via a relational database.

For the purposes of the present discussion, data dimension may be any category or classification of an amount or category. For example, columns of a table may represent data dimensions. The terms "data dimension" and "database dimension" may be employed interchangeably herein.

In the present example embodiment, UI cards 126 and 128 represent a home screen list of analytic cards that may be automatically selected by the system computing environment (as discussed more fully below) to populate home screen 124 based on context information (e.g., with smart feed of UI cards with dynamic BI content, etc.). The context information may include information about what the user has been doing, e.g., user activity, e.g., who recently emailed, texted, or called the user, where the user was when contacted (e.g., where client device 112 associated with the user was), where the user (e.g., client device 112) currently is located (as indicated by the GPS location of client device 112, the current time of day, date, what projects and/or business tasks the user is working on, what teams or enterprise groups the user is associated with, which content the user has been interacting with, user software navigation history, user interaction logs (e.g., tracking usage of computing environment 100), and so on.

Cards that change or update throughout the day, e.g., in approximately real time, to reflect changing context; changing underlying data, etc., are called dynamic cards or dynamically updating cards herein. Note that in certain embodiments discussed herein, automatic selection of cards 126 and 128 are not limited to selections based on individual user context, but may leverage aggregated context information derived or collected from plural users of computing environment 100, including all users of computing environment 100 or subsets thereof. Examples of subsets of users for which context may be aggregated and used include particular enterprise teams, contacts related by social network connections, persons sharing cards with nearby users, and so on.

UI cards 126 and 128 are rendered in part using client software 120. In the present example embodiment, client software 120 (also called a mobile application) includes graphical user interface (GUI) software in communication with speech-to-text software, natural language processing (NLP) software, network communications modules (e.g., mobile synchronization functionality to synchronize communications with BI server system 114 over a network), and so on. Those skilled in the art with access to the present teachings may readily determine, implement, and incorporate appropriate software modules and associated software functionality to meet the needs of a given implementation, without undue experimentation.

Note that in alternative implementations, certain functions of client software 120 may instead be located on BI server system 114 and/or on other servers in communication with BI server system 114. For example, in certain implementations, client software 120 may be implemented via a mobile browser used to access a website hosted by a web server, which in turn uses web services and/or APIs to interface with one or more application servers of BI server system 114 to facilitate updating UI cards 126 and 128.

In the present example embodiment, client software 120 is implemented via a mobile application configured to communicate with and synchronize with a controller module 134 of BI server system 114 to selectively retrieve data (including analytics) needed to implement UI home screen 124 and accompanying UI cards 126 and 128. Data retrieved to the client device 112 during a particular session may be locally cached in a local client-side cache 122. Accordingly, a user of the client device 112 will be able to operate client software 120 and view and interact with cards 126 and 128 that leverage data and/or instructions that are cached in local cache 122.

In various implementations, BI server system 114 leverages functionality provided by various modules 130-142. Controller 134 includes software functionality that facilitates interfacing and using data and functionality from various modules, including a user login and permission module 136, an inference engine 138, an automatic card selection module 140 (also called auto card selector), a card generator module 142, a context information repository 130 (also simply called a context repository 130), stored cards 132 (e.g., stored card content for each user), and one or more enterprise databases 144 (e.g., BI, HCM, CRM, IC, etc.). In various implementations, context repository 130 may include intrinsic user-specified context, extrinsic system-derived context, etc. In some implementations, stored cards 132 may include visualizations.

Note that some of the software functionality provided by modules 130-142 may alternatively and/or additionally be implemented via client software 120. For example, in certain implementations, inference engine 138 may be implemented client-side on client device 112.

In some implementations, controller 134 includes semantic layer interfacing functionality, including online analytical processing (OLAP), additional query term or expression (e.g., natural language input) interpretation (e.g., based on aggregated user context information) functionality, functionality for the mapping of query terms to database dimensions and measures, and so on. In some implementations, controller 134 may include a semantic layer interfacing functionality (e.g., OLAP processing, proposed query term interpretation, mapping of query terms to database dimensions and measures, etc.).

For the purposes of the present discussion, natural language input may be any instruction or information provided via spoken or written (e.g., typed) human language. Examples of language input usable with certain embodiments discussed herein include voice queries and/or commands (which are then converted into text), text messages (e.g., short message service (SMS) text messages), emails containing text, direct text entry, and so on. Natural language input provided to trigger a search for enterprise content is called a natural language query herein.

The login and user permissions module 136 includes computer code for facilitating user login to BI server system 114 (including user authentication and login functionality, etc.). When initially accessing BI server system 114 using client device 112, the user may enter login information (e.g., username and password, biometric information, etc.) or may otherwise submit a biometric sample (e.g., fingerprint scan) to facilitate confirming user identity and application of appropriate restrictions, e.g., data access permissions, to the user client device session with BI server system 114.

Note that user identity and associated data access permissions may represent a type of context information usable by computing environment 100 to selectively adjust content provided via cards 126 and 128. In general, for the purposes of the present discussion, an identity of a user may be any information identifying a user. For example, a user's identity may include login information, email address, phone number, name, biometric sample, and so on. Certain embodiments discussed herein may employ any such identifying information to facilitate, for example, determining a likely command or query term intended by particular language input or software interaction. The identifying information may be further used to associate the user of client device 112 with user-specific data maintained via BI server system 114, e.g., user context information stored in context repository 130, stored cards 132, and so on.

Inference engine 138 includes computer code for facilitating query terms or expression interpretation, e.g., using context information maintained via context repository 130. Inference engine 138 may be used to infer, for example, that the term "profitability" actually refers to a "profit margin"

dimension of an OLAP hypercube harvested from enterprise databases 144 via controller 134 and associated interfaces.

Auto card selector module 140 (which may alternatively and/or additionally be implemented client side, e.g., on client device 112, and based on context information) facilitates accessing OLAP hyper cubes; mapping of natural language input expressions into multi-dimensional expressions (MDX); and selection of card types in accordance with the mappings of the input expressions into database dimensions, measures, analytic calculations, and so on.

Card generator 142 includes computer code for facilitating organizing data for use in visualizations, selections of visualizations in accordance with card type determined by auto card selector 140, collecting rendering data used to render the card, and so on. Note that certain functions of card generator 142 may also be implemented client-side, e.g., generation of card rendering instructions.

Various functional modules 136-142 of BI server system 114 may access data from context repository 130 and from stored cards 132 via interface functionality included in controller 134. The example context repository includes intrinsic user-specified context information, extrinsic system-derived context information, and so on.

Note that the context information maintained by context repository 130 may include dynamic context information, e.g., context information subject to periodic or daily change, including context information subject to approximately real time change. An example of dynamic context information subject to approximately real time change includes GPS location information characterizing client device 112. Additional dynamic context information may include context information indicating who the user is communicating with (and/or has been communicating with), where the user is located, what interactions the user is performing using computing environment 100, when the user is performing the interactions (e.g., communicating, sharing content, following content of other users, and so on), and so on.

Note that the present example embodiment may facilitate dynamic context-based push of BI content to home screen 124, such that home screen 124 is updated periodically or in approximately real time with BI content that is calculated or otherwise determined based in part on dynamic context information.

The dynamic context information may include dynamic extrinsic context information, such as context information that changes based on user interaction with a mobile computing device, e.g., client device 112. The user interaction with the mobile computing device may include moving the device to different locations or regions; automatically updating employee key performance indicators, and so on.

Similarly, non-dynamic context information may include any context information that is not based solely on user interaction with the computing environment 100 via client device 112, e.g., user data access permissions, user name, job role, and so on.

Figure 2:
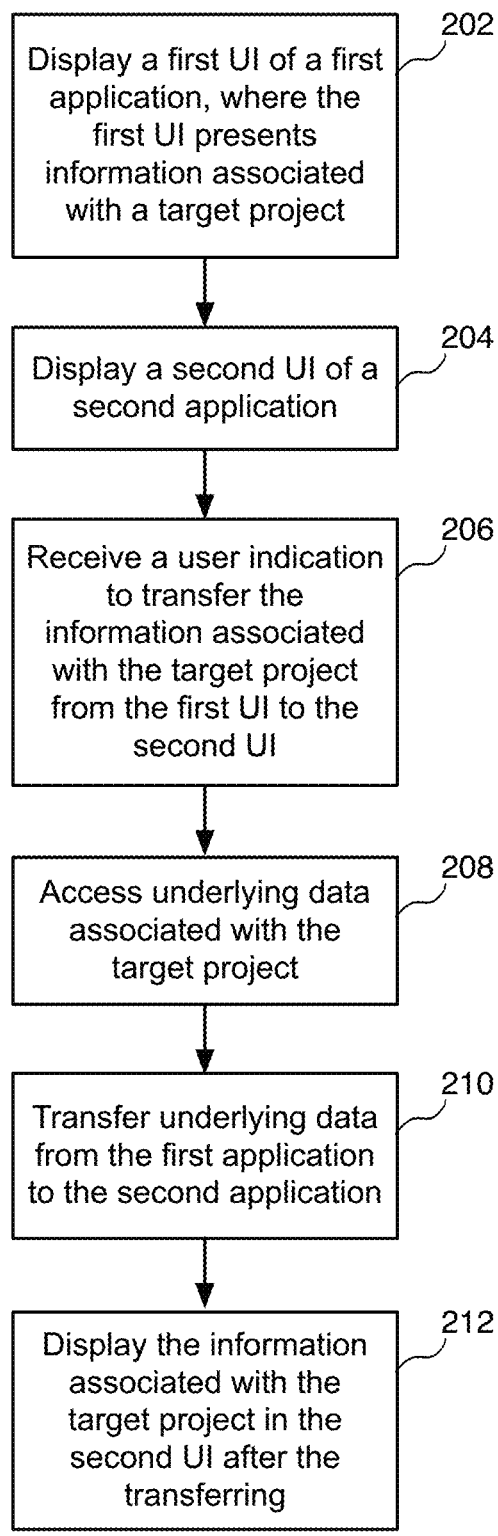
FIG. 2 illustrates an example flow diagram for transferring information from one application to another application, according to some implementations.

FIG. 2 illustrates an example flow diagram for transferring information from one application to another application, according to some implementations. As described in more detail herein, implementations enable a user to share information (e.g., chart data) from one application (e.g., a source application) to another application (e.g., a recipient application) in a split screen mode (multi-window mode) on the device such as a mobile device by dragging and dropping desired information such as a bar chart from the source application into the recipient application.

In various implementations, a method is initiated at block 202, where a system such as client device 112 displays a user interface (UI) of a first application in a display screen of a client device. In various implementations, the UI of the first application presents information associated with a target project. As described in more detail herein, the first application may be referred to as a source application in that the information associated with a target project may be transferred from the source application to a recipient application.

Figure 3:
FIG. 3 illustrates an example UI of a source application, according to some implementations.

FIG. 3 illustrates an example UI 300 of a source application, according to some implementations. As shown, UI 300 of the source application shows rich content such as business intelligence (BI) content, which in this particular example includes a bar chart 302 representing revenue-by-product information. In some implementations, the source application retrieves the information online. As shown, bar chart 302 is a vertical bar chart, and may also be referred to as vertical bar chart 302.

In some implementations, the source application may have a variety of functions, depending on the particular implementations. For example, in some implementations, the source application may enable a user to search for content related to projects, share content, etc. As such, the source application is connected to the Internet in order to perform searches.

As described in more detail herein, the information of the source application may be shared with the recipient application. The information that is to be shared may be referred to as target information, and target information may be associated with a target project.

In various implementations, all of the data associated with the target project may be referred to as underlying data where the target information is a subset of the underlying data. The underlying data associated with the target project may also be referred to as the target underlying data.

Referring still to FIG. 2, at block 204, the system displays a UI of a second application in the display screen of the client device. As described in more detail herein, the second application may be referred to as a recipient application in that the information associated with a target project may be received at the recipient application.

Figure 4:
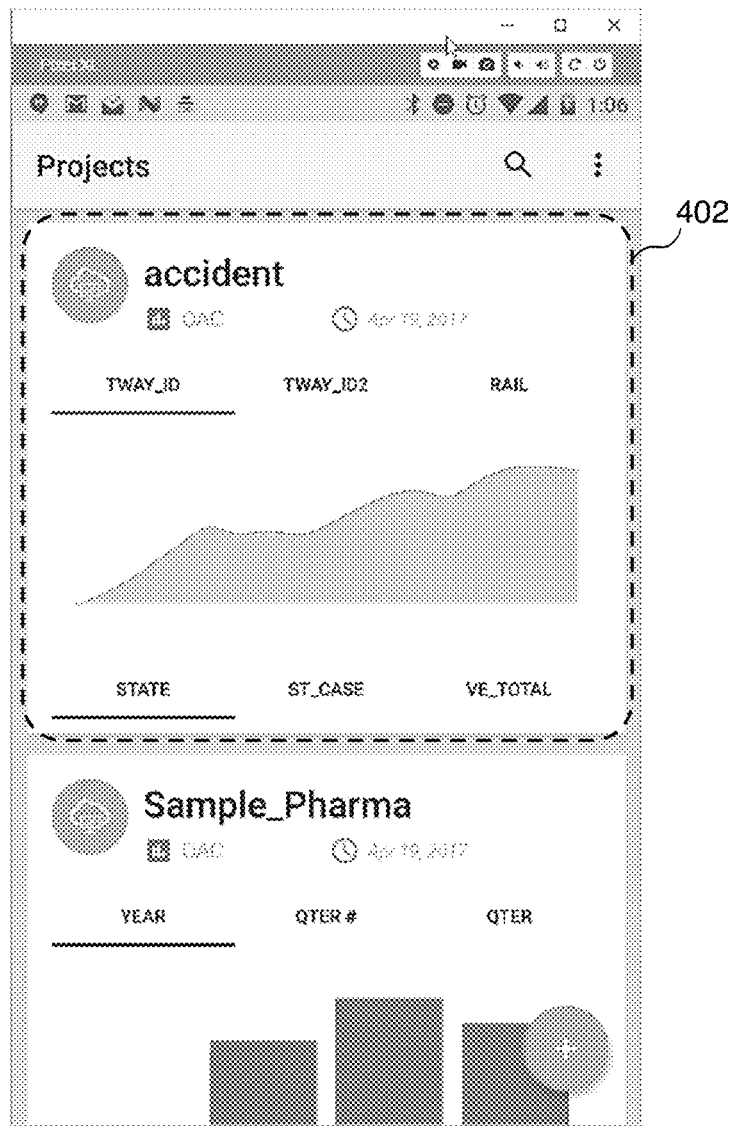
FIG. 4 illustrates an example UI of a recipient application, according to some implementations.

FIG. 4 illustrates an example UI 400 of a recipient application, according to some implementations. As shown, UI 400 of the recipient application shows rich content (e.g., BI content), which in this particular example includes a graph 402 representing accident information.

In some implementations, the recipient application may have a variety of functions, depending on the particular implementations. In this particular example implementation, the recipient application may enable a user to work with content offline. As such, while disconnected from the Internet, a user can manipulate content on a device. In some implementations, the recipient application enables a user to import spreadsheets, files, various types information, etc. In some implementations, the recipient applications may read data and automatically generate charts.

In some implementations, the first UI and the second UI are displayed simultaneously on the display screen in a split screen mode.

Figure 5:
FIG. 5 illustrates an example split screen displaying the UI of the source application and the UI of the recipient application, according to some implementations.

FIG. 5 illustrates an example split screen 500 displaying the UI of the source application and the UI of the recipient application, according to some implementations. As shown, split screen 500 displays UI 300, which displays bar chart 302, and split screen 500 also displays UI 400, which displays graph 402.

Referring still to FIG. 2, at block 206, the system receives a user indication to transfer the information associated with the target project from the first UI to the second UI. In some implementations, the user indication is a drag and drop gesture. In various implementations, the drag and drop process is used to initiate transmission of a uniform resource identifier (URI) of the data payload to the receiving application. The approach of using a content provider facilitates potential exchange of very large (multiple Gigabyte) datasets between applications.

Figure 6:
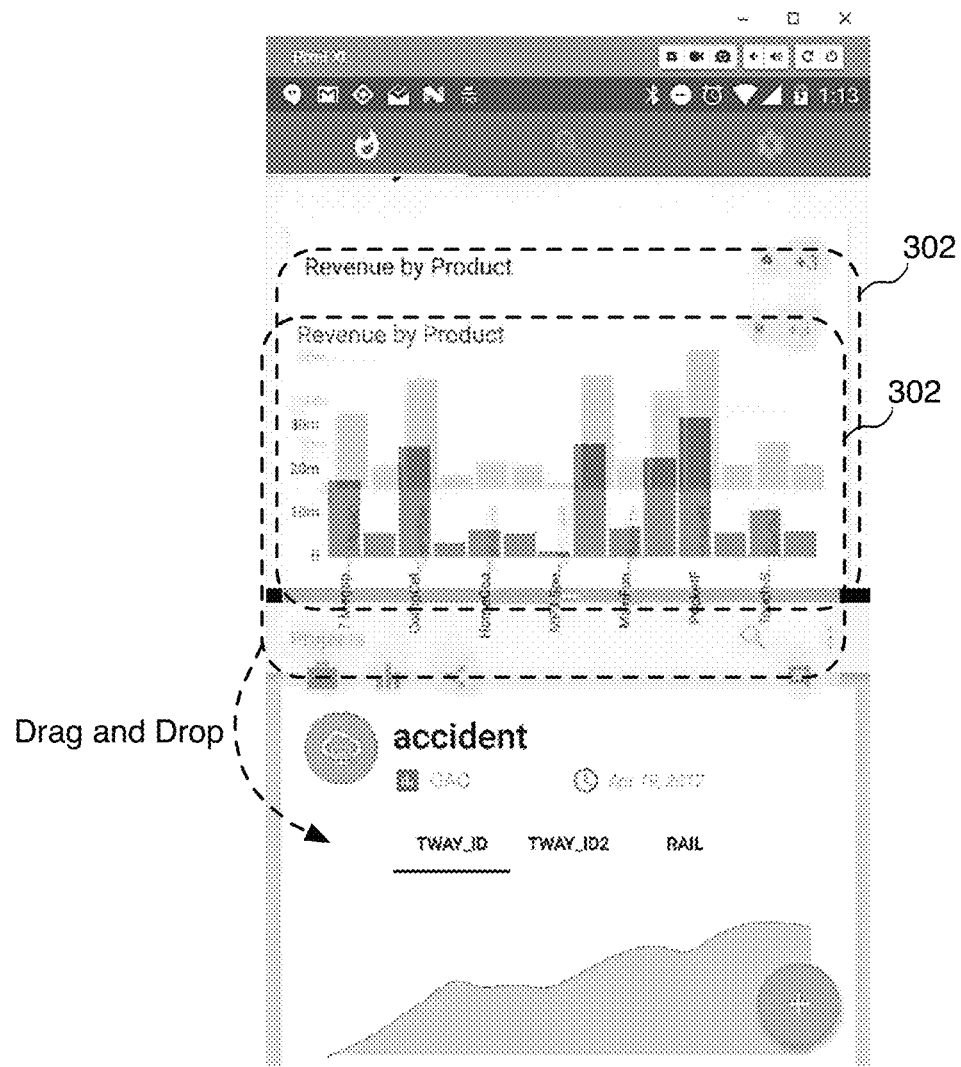
FIG. 6 illustrates an example split screen displaying target information being dragged and dropped from the UI of the source application to the UI of the recipient application, according to some implementations.

FIG. 6 illustrates an example split screen 600 displaying target information being dragged and dropped from the UI of the source application to the UI of the recipient application, according to some implementations. As shown, the target information (e.g., bar chart 302) from the UI of the source application displayed above is being dragged and dropped into the UI of the recipient application displayed below.

In some implementations, to effectuate the drag and drop function, the system enables the user to press and hold (or click and hold) the target information, or more specifically, a data object (e.g., a chart, etc.) associated with the target information. The target information is information that the user desires to drag and drop from the source application to the recipient application. The system enables the user to drag the target information as shown. In some implementations, the system enables the user select the entire object or image displayed by selecting any portion of the target information (e.g., selecting any portion of the bar chart).

In some implementations, if the display is a touch screen (e.g., a touch screen on a mobile device, etc.), the system may enable the user to select the target information by pressing and holding the target information. For example, referring to FIG. 6, the user may press and hold the revenue by product graph shown in the upper UI. In some implementations, if the display is not a touch screen and the user is using a mouse or other input or pointing device, the system may enable the user to select the target information by pointing and clicking (e.g., with a mouse, etc.) on the target information. For example, referring to FIG. 6, the user has pointed and clicked (not release the click) on graph 302 and is dragging graph 302 toward the UI of the recipient application displayed below.

In various implementations, the system receiving the user selection of target information initiates the drag and drop process, and also initiates an information sharing process between the source application and the recipient application.

As indicated above, the system determines where to transfer the underlying data based on where the user drops the target information during the drag and drop process. For example, as shown, the user drops the target information into the bottom UI associated with the recipient application. In some implementations, the system enables the user the drop the target information anywhere in the UI of the recipient application.

Referring still to FIG. 2, at block 208, the system accesses underlying data associated with the target project. This is achieved via the use of shared access to a content provider of which the source application is the owner (a content provider being a secure sandbox location on the device where data can be read and written).

In some implementations, the first application and the second application share a same cryptographic fingerprint. More specifically, both mobile applications share the same cryptographic hash function (e.g., SHA-1) fingerprint in their application manifests respectively. This shared fingerprint allows the receiver application to gain access to the content provider of the source/sender application.

At block 210, the system transfers the underlying data from the first application to the second application. In some implementations, the underlying data is stored at a storage location associated with the first application before the transferring of the underlying data from the first application to the second application.

Figure 8:
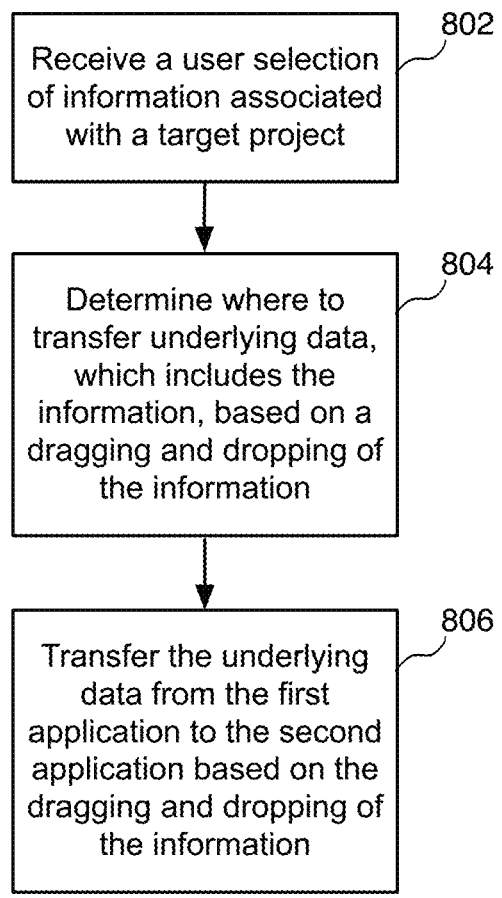
FIG. 8 illustrates an example flow diagram for transferring information from one application to another application, according to some implementations.

Example implementations directed to the transferring of underlying data from a source application to a recipient application is described in more detail herein in connection with FIG. 8.

In some implementations, a copy of the underlying data is stored at a storage location associated with the second application after the transferring of the underlying data from the first application to the second application. In some implementations, the storage location associated with the second application is located on the client device.

At block 212, the system displays the information associated with the target project in the second UI after the transferring.

Figure 7:
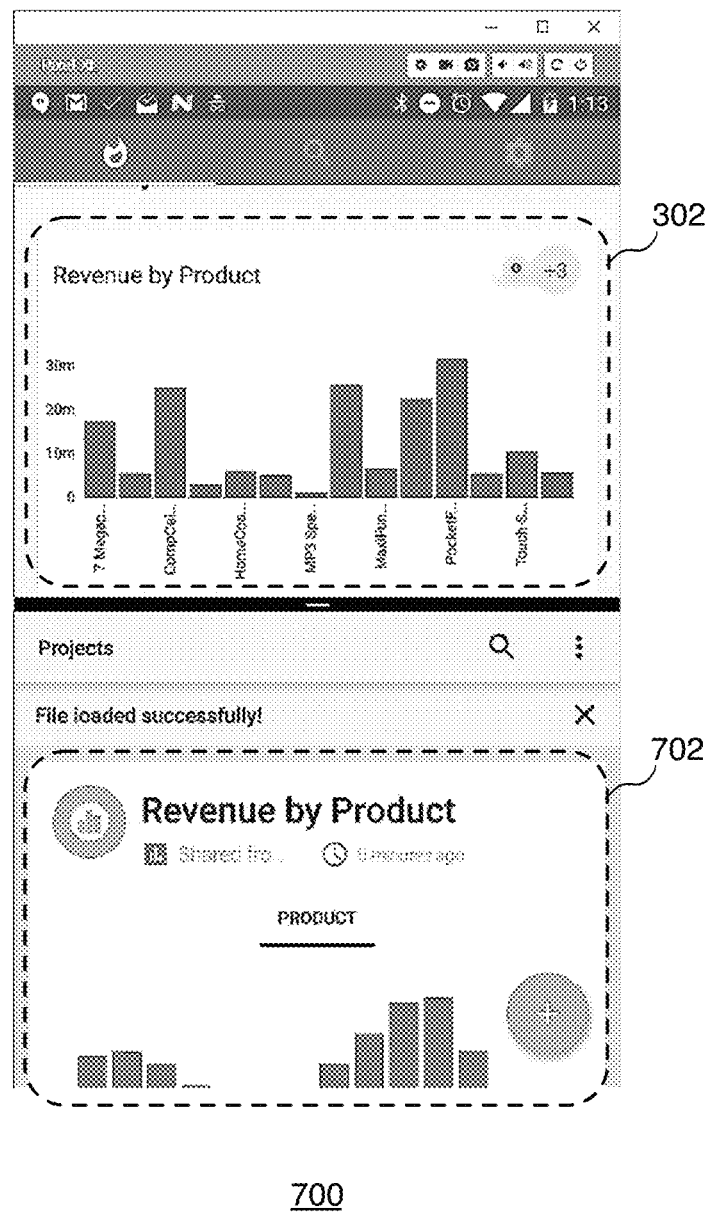
FIG. 7 illustrates an example split screen displaying target information in a UI of a source application and displaying the target information in the UI of the recipient application, according to some implementations.

FIG. 7 illustrates an example split screen 700 displaying target information in a UI of a source application and displaying the target information in the UI of the recipient application, according to some implementations. As shown, the target information (e.g., bar chart 302), which shows revenue-by-product information, is shown in UI of the source application displayed above. The target information including a bar chart 702, which also shows revenue-by-product information, is shown in the UI of the recipient application displayed below. In various implementations, bar chart 302 and bar chart 702 may have different appearances, because each UI may render bar charts differently. Also, in some implementations, a recipient application may render different default information than the currently displayed information in the source application. For example, in some scenarios, the source application may be applying filters to a currently rendered bar chart, whereas the recipient application may render a bar chart with no filters. The underlying data used to render bar chart 702 is a copy of the underlying data used to render chart 302.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

FIG. 8 illustrates an example flow diagram for transferring information from one application to another application, according to some implementations. As described in more detail herein, implementations enable a user to drag and drop target information from a source application into a recipient application. In various implementations, the drag and drop process is more than a simple drag and drop process. The drag and drop process described herein initiates and carries out in a user-friendly manner a separate process of transferring target information as well as associated underlying data from one application to another application.

In various implementations, a method is initiated at block 802, where a system such as client device 112 receives a user selection of target information associated with a target project. In various implementations, the target information is displayed in a UI. For example, referring again to FIG. 5, the target information may be bar chart 302. The system may receive the user selection when the user selects bar chart 302, for example. In some implementations, block 802 of FIG. 8 may correspond to block 206 of FIG. 2.

At block 804, the system determines where to transfer underlying data, which includes the target information associated with the target project. In various implementations, the system determines where to transfer the underlying data based on the dragging and dropping of the target information. For example, referring to FIG. 6, an object such as bar chart 302 is shown as being dragged and dropped from the UI of the source application to the UI of the recipient application. The user releasing or dropping bar chart 302 into the UI of the recipient application indicates the application to which the system transfers the underlying data.

At block 806, the system transfers the underlying data, which includes the target information, from the source application to the recipient application based on the dragging and dropping of the target information. As indicated herein, in various implementations, the transfer of the underlying data from the source application and the recipient application is carried out in conjunction with the drag and drop process. In various implementations, block 806 of FIG. 8 may correspond to block 210 of FIG. 2.

In various implementations, the transfer of underlying data from the source application to the recipient application may be achieved via the use of shared access to a content provider of which the source application is the owner. For example, the content provider may be a secure sandbox location on the client device where data may be read and written.

As indicated herein, the first application and the second application may share the same cryptographic fingerprint, or, more specifically, the same cryptographic hash function (e.g., SHA-1) fingerprint in their application manifests. This shared fingerprint enables the receiver application to gain access to the content provider of the source/sender application. In various implementations, the drag and drop process may be used to initiate transmission of a uniform resource identifier (URI) of the data payload to the recipient application.

In some implementations, when the system determines where to transfer the underlying data, the system may perform the transfer of the underlying data by enabling or causing the recipient application gain access (e.g., retrieve or receive) the target information. The approach of using a content provider facilitates the exchange of very large datasets (e.g., multiple Gigabytes) between applications.

As shown in the various implementations described herein, the system enables the user to manipulate the underlying data online and/or offline. In various implementations, the data is stored on the client device, and the recipient application enables the user to manipulate the data offline.

Figure 9:
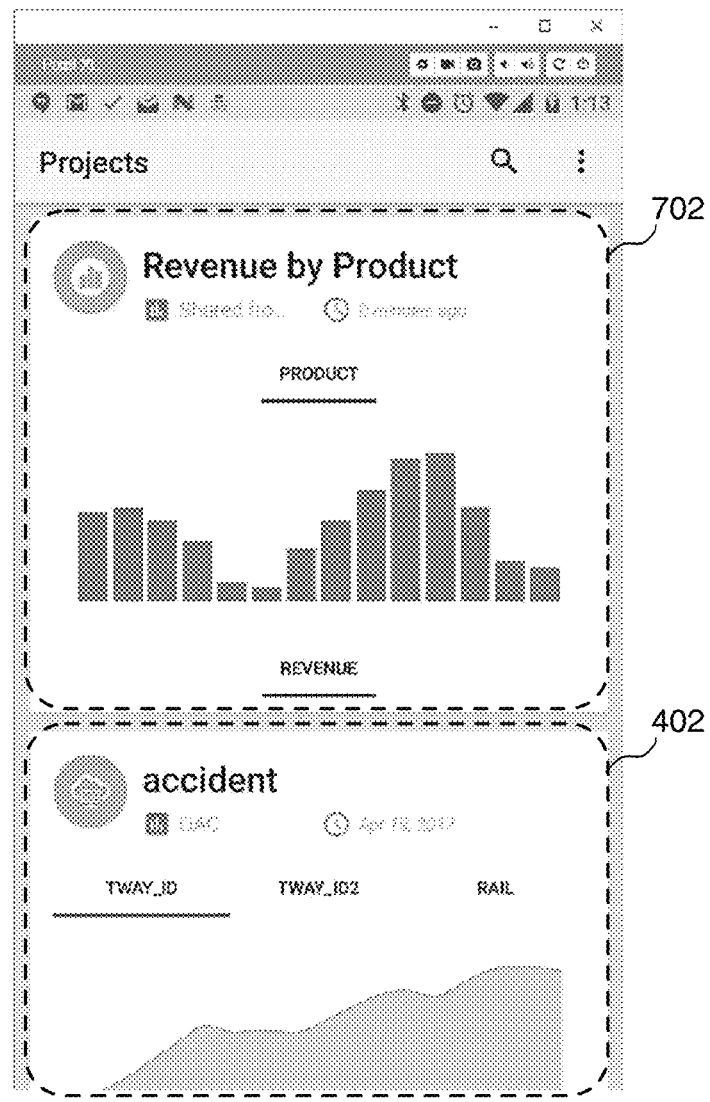
FIG. 9 illustrates an example UI of a recipient application after having received target information from a source application, according to some implementations.

FIG. 9 illustrates an example UI 900 of a recipient application after having received target information from a source application, according to some implementations. Shown is bar chart 702 (revenue-by-product information), which had been rendered by the recipient application based on underlying data that the recipient application received from the source application. Also shown is other information such as graph 402 (accident information). Bar chart 702 and graph 402 are both displayed in UI 900.

In various implementations, the visible target information such as the revenue by product chart represents a portion of the entirety of the underlying data that has been transferred from the source application to the recipient application. In other words, when the user selects an object such as a chart being displayed, the system enables the user to select any amount of context information including any metadata about or otherwise associated with the object.

In various implementations, once the recipient application possesses the underlying data, the recipient application may then process, manipulate, arrange, and display the underlying data in a variety of ways. For example, the recipient application may generate various reports and charts using the underlying data.

In various implementations, the completion of the dropping of the target information into the UI of the recipient application initiates a transfer process of the underlying data, where system transfers the underlying data from the source application to the recipient application.

Figure 10:
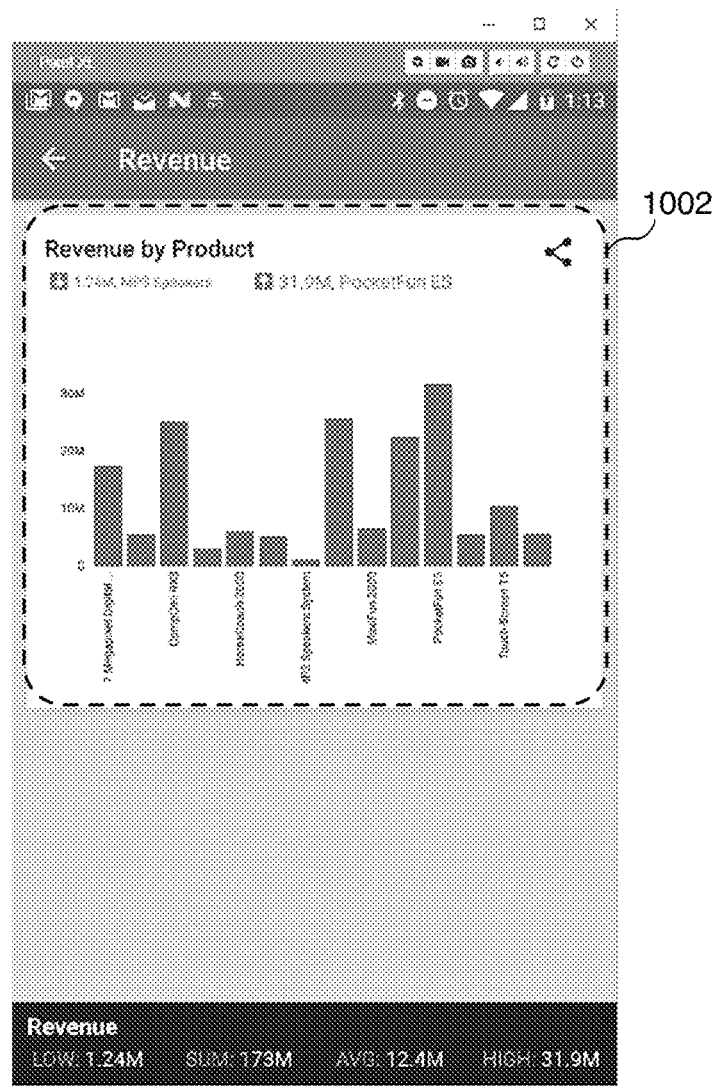
FIG. 10 illustrates an example UI displaying a vertical bar chart, according to some implementations.

FIG. 10 illustrates an example UI 1000 displaying a vertical bar chart 1002, according to some implementations. As shown, by transferring the underlying data from the source application to the recipient application, the recipient application can generate various graphs showing different information. For example, vertical bar chart 1002 shows revenue-by-product information, where each bar represents revenue for a particular product.

Figure 11:
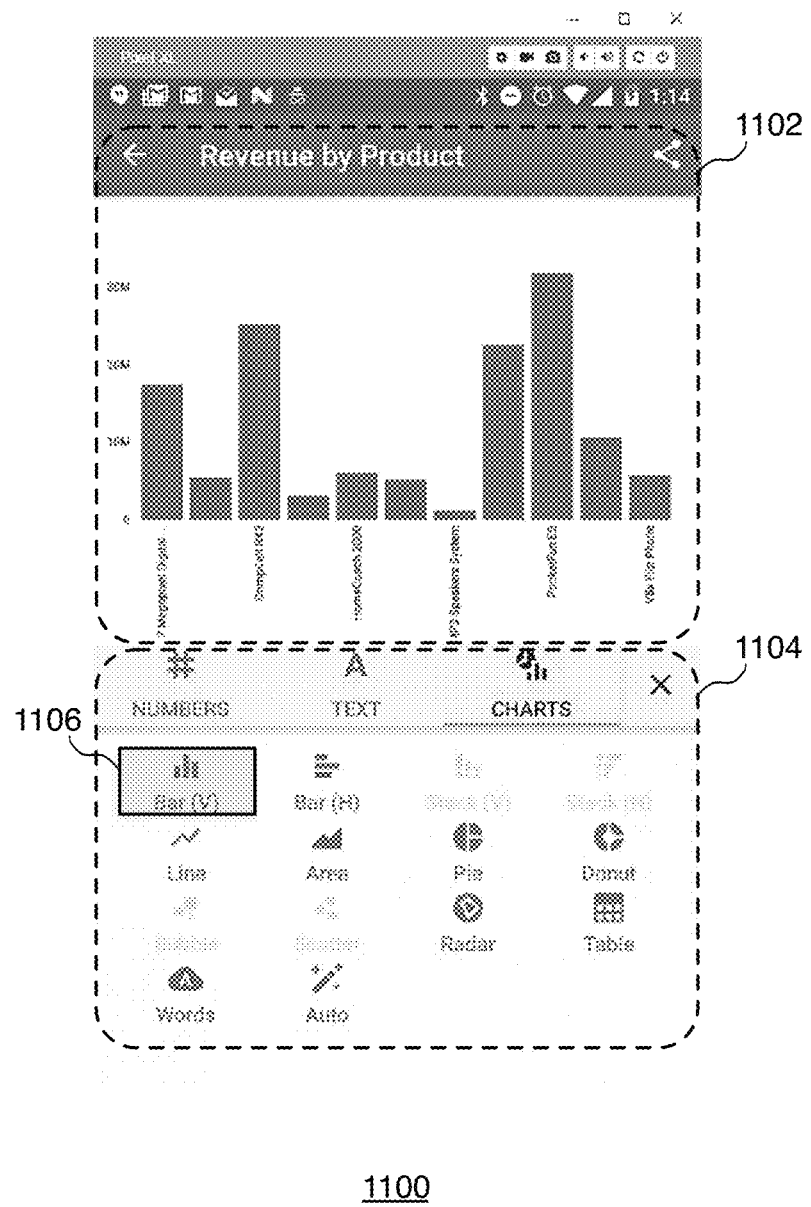
FIG. 11 illustrates an example UI displaying a vertical bar chart and a menu of view options, according to some implementations.

FIG. 11 illustrates an example UI 1100 displaying a vertical bar chart 1102 and a menu 1104 of view options, according to some implementations. In various implementations, view options shown in menu 1104 are available to user and enable the user to manipulate the underlying data, such as showing different views of the underlying data. For example, by the user selecting vertical bar chart icon 1106, the system renders vertical bar chart 1102 from the underlying data.

Figure 12:
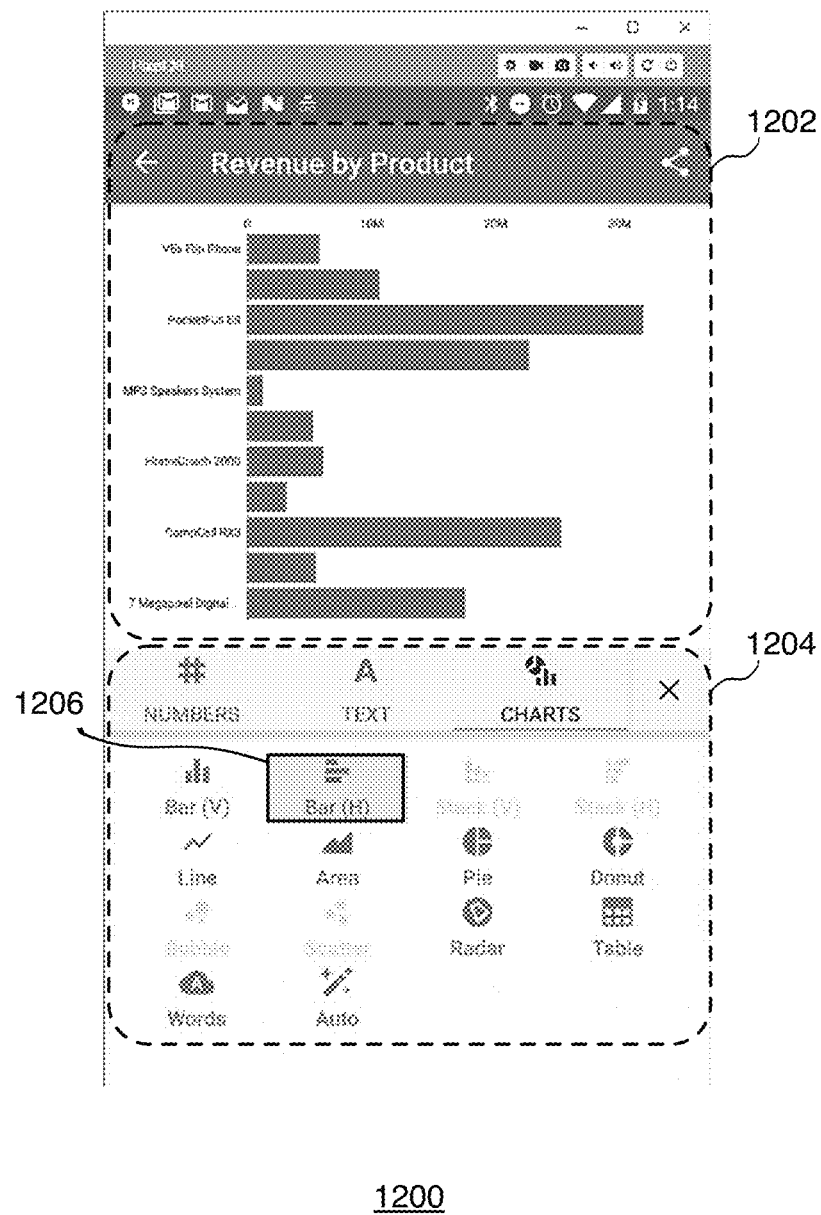
FIG. 12 illustrates an example UI displaying a horizontal bar chart and a menu of view options, according to some implementations.

FIG. 12 illustrates an example UI 1200 displaying a horizontal bar chart 1202 and a menu 1204 of view options, according to some implementations. As shown, the user may change the bar chart (e.g., convert the bar chart from a vertical bar chart to a horizontal bar chart) by selecting a different icon. In this particular example, a horizontal bar icon 1206 is selected, which renders horizontal bar chart 1202. In some implementations, the menu shown with a particular chart or graph may vary (e.g., have different view options), depending on the particular view available and the particular implementation.

Figure 13:
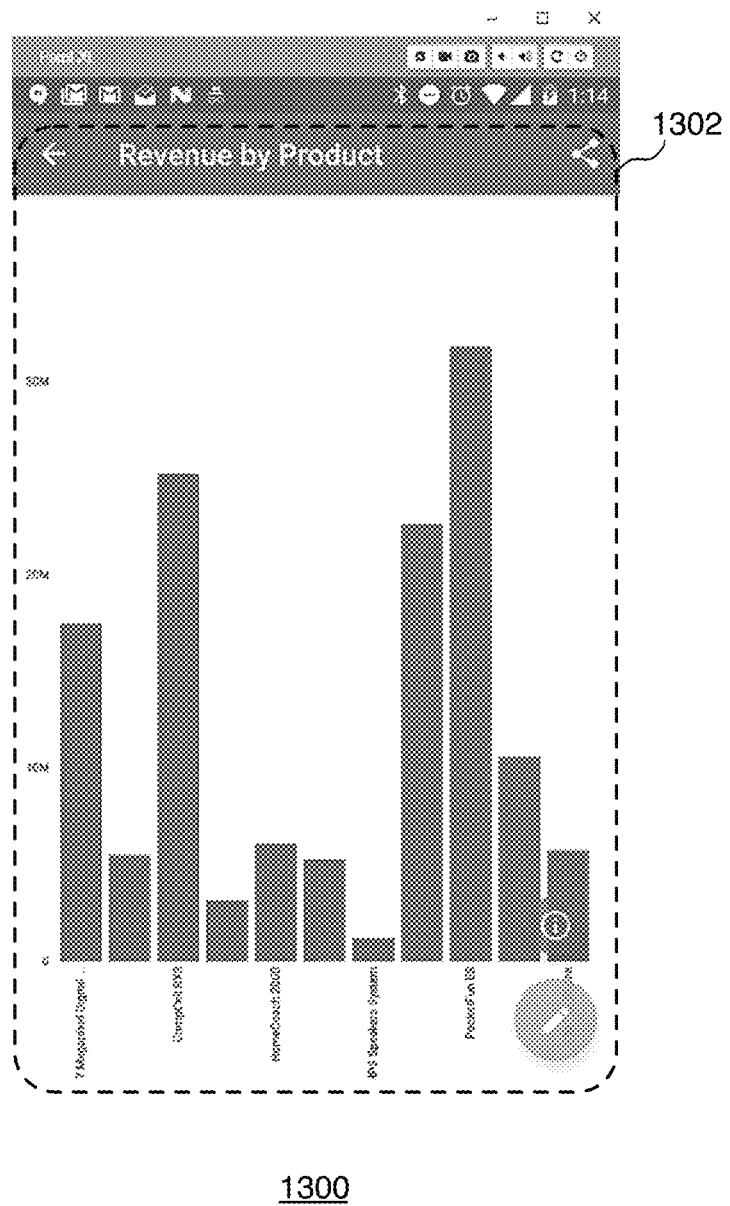
FIG. 13 illustrates an example UI displaying a vertical bar chart, according to some implementations.

FIG. 13 illustrates an example UI 1300 displaying a vertical bar chart 1302, according to some implementations. As shown, vertical bar chart 1302 is yet another example that the system may render from the underlying data.

Figure 14:
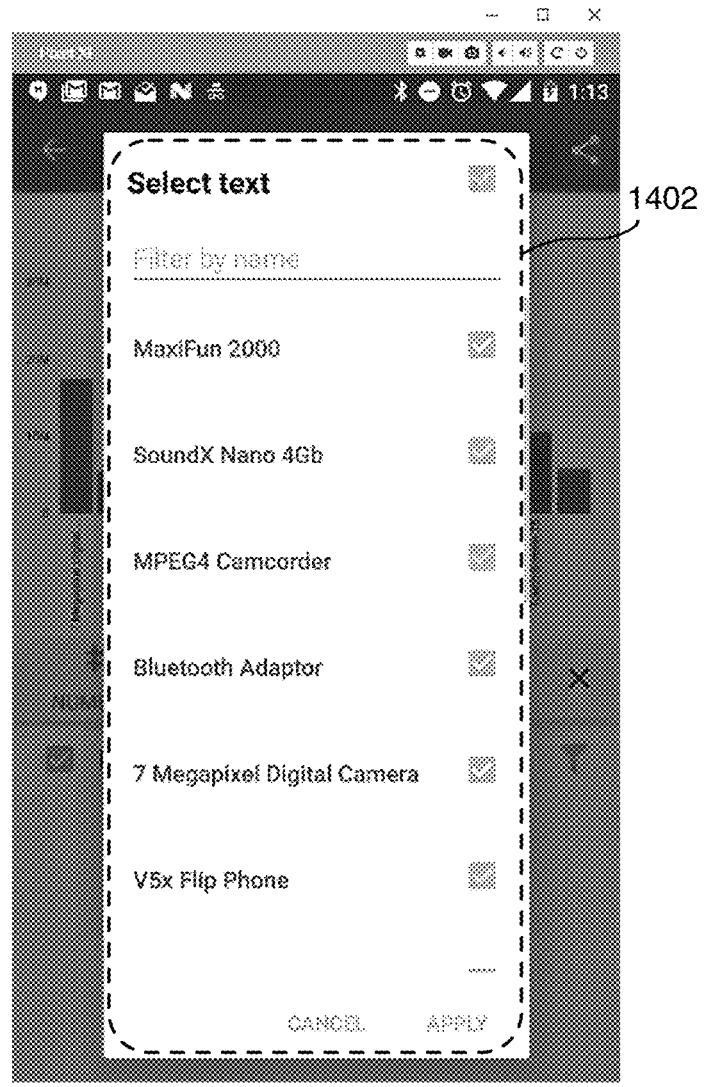
FIG. 14 illustrates an example UI displaying a menu showing filtering options, according to some implementations.

FIG. 14 illustrates an example UI 1400 displaying a menu 1402 showing filtering options, according to some implementations. As shown, menu 1402 shows selection functionality, where the system enables a user to select particular text or labels associated with particular data. For example, the text or labels may be associated with information associated with particular products. Such information may be a part of the underlying data transferred from the source application to the recipient application. In various implementations, the system enables the user to filter information associated with the underlying target data. In this particular example, information associated with the items selected by the user may be displayed in a graphical image.

Figure 15:
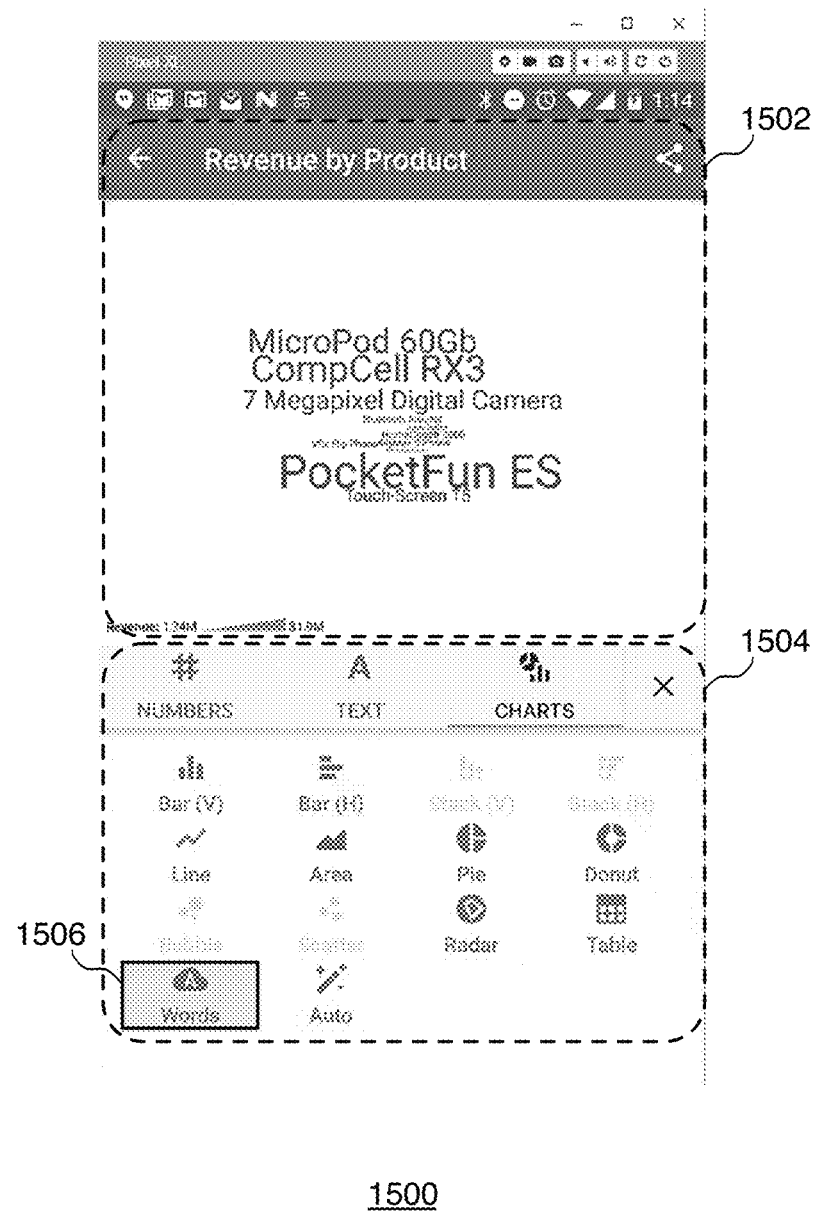
FIG. 15 illustrates an example UI displaying a word cloud view, according to some implementations.

FIG. 15 illustrates an example UI 1500 displaying a word cloud view 1502, according to some implementations. Also shown, is a menu 1504 that includes various view options. In various implementations, the system enables a user to select a view option such as a word cloud view icon 1504. By the user selecting word cloud view icon 1504, the system renders word cloud view 1502 from the underlying target data. In some implementations, word cloud view shows an image composed of words used in a particular text or subject, where the size of each word that is displayed indicates its frequency or importance.

Implementations described herein provide various benefits. For example, implementations enable and facilitate convenient transfer of information from one application to another application. Implementations also avoid the need for "intents," which normally would call for the user to select a piece of content they wish to open. As such, implementations avoid the need for a user to select applications from a list (e.g., in order to open an attached PDF in an email application).

Figure 16:
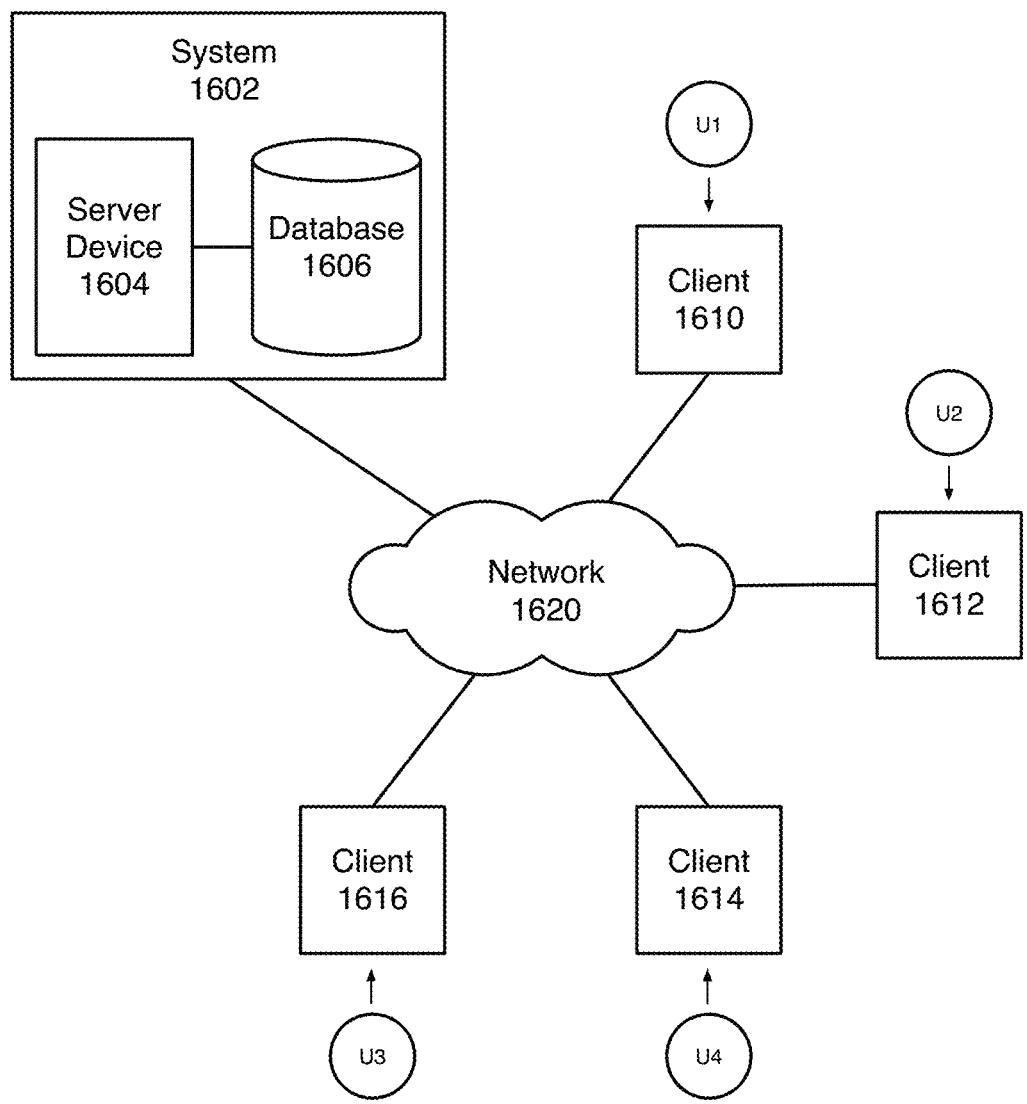
FIG. 16 illustrates a block diagram of an example network environment, which may be used for implementations described herein.

FIG. 16 illustrates a block diagram of an example network environment 1600, which may be used for implementations described herein. In some implementations, network environment 1600 includes a system 1602, which includes a server device 1604 and a network database 1606. Network environment 1600 also includes client devices 1610, 1612, 1614, and 1616, which may communicate with each other directly or via system 1602. Network environment 1600 also includes a network 1620.

Implementations described herein may be implemented by a client device such as client devices 1610, 1612, 1614, and 1616, or may be implemented by client devices 1610, 1612, 1614, and 1616 in combination with a system 1602. In some implementations, client devices 1610, 1612, 1614, and 1616 communicate with system 1602.

For ease of illustration, FIG. 16 shows one block for each of system 1602, server device 1604, and network database 1606, and shows four blocks for client devices 1610, 1612, 1614, and 1616. Blocks 1602, 1604, and 1606 may represent multiple systems, server devices, and network databases. Also, there may be any number of client devices. In other implementations, network environment 1600 may not have all of the components shown and/or may have other elements including other types of elements instead of, or in addition to, those shown herein. In various implementations, users U1, U2, U3, and U4 may view various information using respective client devices 1610, 1612, 1614, and 1616.

While system 1602 of FIG. 16 is described as performing the implementations described herein, any suitable component or combination of components of system 1602 or any suitable processor or processors associated with system 1602 may perform the implementations described.

Figure 17:
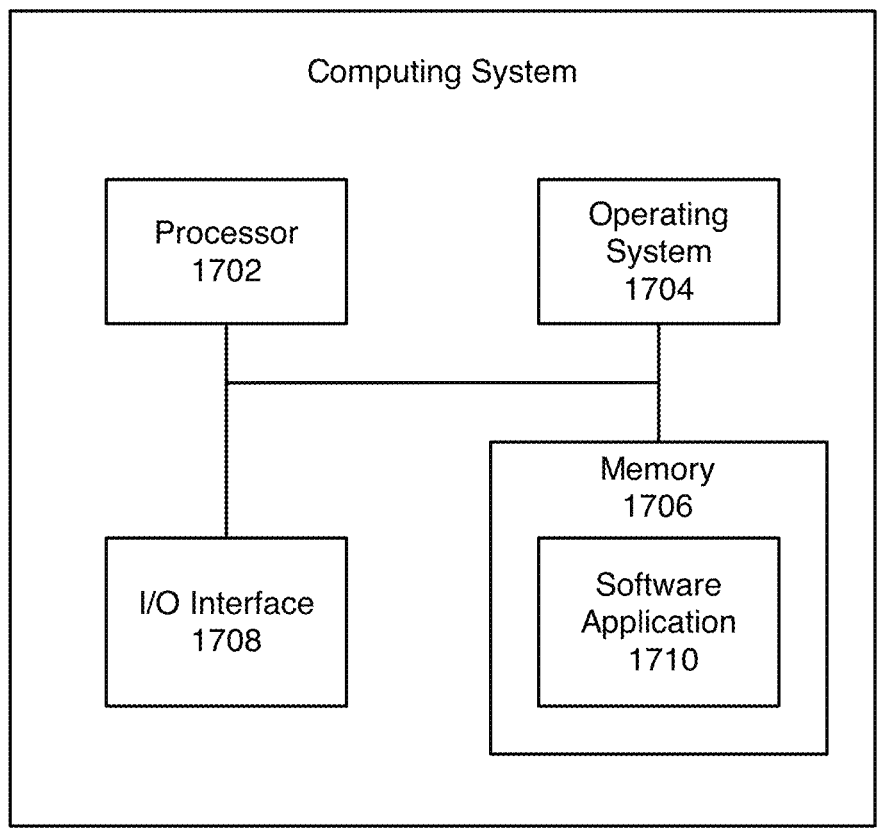
FIG. 17 illustrates a block diagram of an example computing system, which may be used for some implementations described herein.

FIG. 17 illustrates a block diagram of an example computing system 1700, which may be used for some implementations described herein. For example, computing system 1700 may be used to implement user client device 112 and/or BI server system 114 of FIG. 1. Computing system 1700 may also be used to implement system 1602 and/or any of client devices 1610, 1612, 1614, and 1616 of FIG. 16, as well as to perform implementations described herein. In some implementations, computing system 1700 may include a processor 1702, an operating system 1704, a memory 1706, and an input/output (I/O) interface 1708. In various implementations, processor 1702 may be used to implement various functions and features described herein, as well as to perform the method implementations described herein. While processor 1702 is described as performing implementations described herein, any suitable component or combination of components of computing system 1700 or any suitable processor or processors associated with computing system 1700 or any suitable system may perform the steps described. Implementations described herein may be carried out on a user device, on a server, or a combination of both.

Computing system 1700 also includes a software application 1710, which may be stored on memory 1706 or on any other suitable storage location or computer-readable medium. Software application 1710 provides instructions that enable processor 1702 to perform the implementations described herein and other functions. Software application may also include an engine such as a network engine for performing various functions associated with one or more networks and network communications. The components of computing system 1700 may be implemented by one or more processors or any combination of hardware devices, as well as any combination of hardware, software, firmware, etc.

For ease of illustration, FIG. 17 shows one block for each of processor 1702, operating system 1704, memory 1706, I/O interface 1708, and software application 1710. These blocks 1702, 1704, 1706, 1708, and 1710 may represent multiple processors, operating systems, memories, I/O interfaces, and software applications. In various implementations, computing system 1700 may not have all of the components shown and/or may have other elements including other types of components instead of, or in addition to, those shown herein.

Further details of embodiments may be found in the attached documents provided with this application as follows: U.S. patent application Ser. No. 15/273,567, entitled DAY-BY-DAY, filed on Sep. 22, 2016.

Although the description has been described with respect to particular embodiments thereof, these particular embodiments are merely illustrative, and not restrictive. For example, while various embodiments herein are discussed with respect to mobile device BI application implementations, embodiments are not limited thereto. Various embodiments disclosed herein may be adapted for use with virtually any computer, including desktop computers. Furthermore, embodiments are not limited to facilitating conveying BI information, tools, and analytics.

In various implementations, program instructions or software instructions are stored on or encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer-readable storage medium carrying program instructions thereon, the instructions when executed by one or more processors cause the one or more processors to perform operations comprising:
    displaying a first user interface (UI) of a first application in a display screen of a client device, wherein the first UI displays one or more analytics cards that present, as a chart, display information associated with a target project, wherein the one or more analytics cards include an option to change a type of the chart without modifying underlying data;
    displaying a second UI of a second application in the display screen of the client device;
    receiving a user indication to transfer a subset of the display information, including the chart, associated with the target project from the first UI to the second UI;
    accessing a subset of the underlying data corresponding with the subset of the display information and associated with the target project;
    using link information to determine additional underlying data that is in addition to the subset of the underlying data corresponding with the subset of the display information and associated with the target project;
    transferring the subset of the underlying data and the additional underlying data from the first application to the second application by using a secure content provider sandbox on the client device from which data is read and written, wherein the transferring of the subset of the underlying data and the additional underlying data includes transmission of a uniform resource identifier (URI) of a data payload, including the underlying data, to the second application, and wherein the underlying data is manipulated both online and offline, wherein the transferring of the underlying data and the additional underlying data is achieved via shared access to a content provider of which the first application is an owner and wherein the first application and the second application share a cryptographic hash function fingerprint; and
    displaying the subset of the display information associated with the target project in the second UI after the transferring, wherein the second UI displays one or more analytics cards that present information in the chart, and wherein the one or more analytics cards include the option to change the type of the chart without modifying the underlying data, and wherein, after the transferring of the underlying data and the additional underlying data, versions of the chart displayed by the first UI and the second UI have a different appearance from each other.

2. The computer-readable storage medium of claim 1, wherein the first UI and the second UI are displayed simultaneously on the display screen in a split screen mode.

3. The computer-readable storage medium of claim 1, wherein the user indication is a drag and drop gesture.

4. The computer-readable storage medium of claim 1, wherein the first application and the second application share the cryptographic hash function fingerprint to allow access to the secure content provider sandbox.

5. The computer-readable storage medium of claim 1, wherein the underlying data is stored at a storage location associated with the first application before the transferring.

6. The computer-readable storage medium of claim 1, wherein a copy of the underlying data is stored at a storage location associated with the second application after the transferring.

7. The computer-readable storage medium of claim 1, wherein a copy of the underlying data is stored at a storage location associated with the second application after the transferring, and wherein the storage location is located on the client device.

8. The computer-readable storage medium of claim 1, wherein the instructions when executed further cause the one or more processors to perform operations comprising:
    receiving a user selection of the information associated with the target project;
    determining where to transfer the underlying data that includes the information associated with the target project based on a dragging and dropping of the information; and
    transferring the underlying data from the first application to the second application based on the dragging and dropping of the information.

9. A method for inter-application sharing, the method comprising:
    displaying a first user interface (UI) of a first application in a display screen of a client device, wherein the first UI displays one or more analytics cards that present, as a chart, display information associated with a target project, wherein the one or more analytics cards include an option to change a type of the chart without modifying underlying data;
    displaying a second UI of a second application in the display screen of the client device;
    receiving a user indication to transfer a subset of the display information, including the chart, associated with the target project from the first UI to the second UI;
    accessing a subset of the underlying data corresponding with the subset of the display information and associated with the target project;
    using link information to determine additional underlying data that is in addition to the subset of the underlying data corresponding with the subset of the display information and associated with the target project;
    transferring the subset of the underlying data and the additional underlying data from the first application to the second application by using a secure content provider sandbox on the client device from which data is read and written, wherein the transferring of the subset of the underlying data and the additional underlying data includes transmission of a uniform resource identifier (URI) of a data payload, including the underlying data, to the second application, and wherein the underlying data is manipulated both online and offline, wherein the transferring of the underlying data and the additional underlying data is achieved via shared access to a content provider of which the first application is an owner and wherein the first application and the second application share a cryptographic hash function fingerprint;

and displaying the subset of the display information associated with the target project in the second UI after the transferring, wherein the second UI displays one or more analytics cards that present information in the chart, and wherein the one or more analytics cards include the option to change the type of the chart without modifying the underlying data, and wherein, after the transferring of the underlying data and the additional underlying data, versions of the chart displayed by the first UI and the second UI have a different appearance from each other.

10. The method of claim 9, wherein the first UI and the second UI are displayed simultaneously on the display screen in a split screen mode.

11. The method of claim 9, wherein the user indication is a drag and drop gesture.

12. The method of claim 9, wherein the first application and the second application share the cryptographic hash function fingerprint to allow access to the secure content provider sandbox.

13. The method of claim 9, wherein the underlying data is stored at a storage location associated with the first application before the transferring.

14. The method of claim 9, wherein a copy of the underlying data is stored at a storage location associated with the second application after the transferring.

15. The method of claim 9, wherein a copy of the underlying data is stored at a storage location associated with the second application after the transferring, and wherein the storage location is located on the client device.

16. The method of claim 9, wherein the method further comprises:
  receiving a user selection of the information associated with the target project;
  determining where to transfer the underlying data that includes the information associated with the target project based on a dragging and dropping of the information; and
  transferring the underlying data from the first application to the second application based on the dragging and dropping of the information.

17. An apparatus comprising:
  one or more processors; and
  logic encoded in one or more non-transitory computer-readable storage media for execution by the one or more processors and when executed operable to perform operations comprising:
   displaying a first user interface (UI) of a first application in a display screen of a client device, wherein the first UI displays one or more analytics cards that present, as a chart, display information associated with a target project, wherein the one or more analytics cards include an option to change a type of the chart without modifying underlying data;
   displaying a second UI of a second application in the display screen of the client device;
   receiving a user indication to transfer a subset of the display information, including the chart, associated with the target project from the first UI to the second UI;
   accessing a subset of the underlying data corresponding with the subset of the display information and associated with the target project;
   using link information to determine additional underlying data that is in addition to the subset of the underlying data corresponding with the subset of the display information and associated with the target project;
   transferring the subset of the underlying data and the additional underlying data from the first application to the second application by using a secure content provider sandbox on the client device from which data is read and written, wherein the transferring of the subset of the underlying data and the additional underlying data includes transmission of a uniform resource identifier (URI) of a data payload, including the underlying data, to the second application, and wherein the underlying data is manipulated both online and offline, wherein the transferring of the underlying data and the additional underlying data is achieved via shared access to a content provider of which the first application is an owner and wherein the first application and the second application share a cryptographic hash function fingerprint; and
   displaying the subset of the display information associated with the target project in the second UI after the transferring, wherein the second UI displays one or more analytics cards that present information in the chart, and wherein the one or more analytics cards include the option to change the type of the chart without modifying the underlying data, and wherein, after the transferring of the underlying data and the additional underlying data, versions of the chart displayed by the first UI and the second UI have a different appearance from each other.

18. The apparatus of claim 17, wherein the first UI and the second UI are displayed simultaneously on the display screen in a split screen mode.

19. The apparatus of claim 17, wherein the user indication is a drag and drop gesture.

20. The apparatus of claim 17, wherein the first application and the second application share the cryptographic hash function fingerprint to allow access to the secure content provider sandbox.

* * * * *